(12) United States Patent
Shattil

(10) Patent No.: US 7,839,941 B2
(45) Date of Patent: Nov. 23, 2010

(54) MULTIPLE ACCESS METHOD AND SYSTEM

(76) Inventor: Steve Shattil, 4980 Meredith Way, #201, Boulder, CO (US) 80303

(*) Notice: Subject to any disclaimer, the term of this patent is extended or adjusted under 35 U.S.C. 154(b) by 0 days.

(21) Appl. No.: 11/365,264

(22) Filed: Feb. 28, 2006

(65) Prior Publication Data
US 2006/0227851 A1 Oct. 12, 2006

Related U.S. Application Data

(63) Continuation-in-part of application No. 09/381,588, filed on Sep. 20, 1999, now Pat. No. 7,010,048, which is a continuation-in-part of application No. PCT/US99/02838, filed on Feb. 10, 1999, which is a continuation-in-part of application No. 09/022,950, filed on Feb. 12, 1998, now Pat. No. 5,955,992.

(51) Int. Cl.
*H04L 27/28* (2006.01)
(52) U.S. Cl. ....................................... 375/260
(58) Field of Classification Search ................. 375/259, 375/260, 295, 296, 130, 140, 146, 147, 316
See application file for complete search history.

(56) References Cited
U.S. PATENT DOCUMENTS

| | | | | |
|---|---|---|---|---|
| 4,479,226 A | * | 10/1984 | Prabhu et al. | 380/34 |
| 5,543,806 A | * | 8/1996 | Wilkinson | 342/368 |
| 5,862,189 A | * | 1/1999 | Huisken et al. | 375/341 |
| 6,243,565 B1 | * | 6/2001 | Smith et al. | 455/101 |
| 6,301,221 B1 | * | 10/2001 | Paterson | 370/208 |
| 6,421,528 B1 | * | 7/2002 | Rosen et al. | 455/67.16 |
| 6,442,222 B1 | * | 8/2002 | Ghazi-Moghadam et al. | 375/347 |
| 6,459,740 B1 | * | 10/2002 | Lo | 375/259 |
| 6,463,295 B1 | * | 10/2002 | Yun | 455/522 |
| 6,470,055 B1 | * | 10/2002 | Feher | 375/259 |
| 6,473,418 B1 | * | 10/2002 | Laroia et al. | 370/344 |
| 6,636,495 B1 | * | 10/2003 | Tangemann | 370/334 |

* cited by examiner

*Primary Examiner*—Kevin M Burd
(74) *Attorney, Agent, or Firm*—Connolly Bove Lodge & Hutz LLP

(57) ABSTRACT

A wireless communication system that transmits data on multiple carriers simultaneously to provide frequency diversity includes an antenna array, which may provide for transmit diversity. Complex coding applied to the carriers and carrier frequency separation control time-domain characteristics of a superposition of the carriers. Each transmitter of a transmitter array may be provided with at least one carrier of the multi-carrier signal. A periodic relative phase relationship applied to the carriers causes a periodic variation in the transmitter array's beam pattern. A periodic phase relationship between the carriers provides periodic scanning of the beam pattern transmitted by the antenna array. Embodiments of the invention may be employed with OFDM and frequency hopping.

20 Claims, 7 Drawing Sheets

MULTIPLE ACCESS METHOD AND SYSTEM

RELATED CASES

This application is a continuation-in-part of U.S. Ser. No. 09/381,588, filed Sep. 20, 1999, now U.S. Pat. No. 7,010,048, which is a continuation-in-part of PCT application Ser. No. PCT/US99/02838, filed Feb. 10, 1999, which is a continuation-in-part of U.S. patent application Ser. No. 09/022,950, filed Feb. 12, 1998, now U.S. Pat. No. 5,955,992.

FIELD OF THE INVENTION

The present invention relates to a novel multicarrier spread-spectrum protocol for wireless and waveguide communications and radar.

BACKGROUND OF THE INVENTION

Multipath fading is the fluctuation in a received signal's amplitude. It is caused by interference between two or more versions of the transmitted signal that arrive at a receiver at different times. This interference results from reflections from the ground and nearby structures. The amount of multipath fading depends on the intensity and propagation time of the reflected signals and the bandwidth of the transmitted signal. The received signal may consist of a large number of waves having different amplitudes, and phases, and angles of arrival. These components combine vectorally at the receiver and cause the received signal to fade or distort.

The fading and distortion change as the receiver and other objects in the radio environment move. These multipath effects depend on the bandwidth of the signal being transmitted. If the transmitted signal has a narrow bandwidth (i.e., the duration of the data bits transmitted is longer than the delay resulting from multipath reflections), then the received signal exhibits deep fades as the receiver moves in a multipath environment. This is known as flat fading. A significant amount of power control (e.g. increasing the transmit power and/or the receiver gain) is needed to compensate for deep fades. In addition, low data-rate signals experience distortion if the characteristics of the radio environment change significantly during the duration of a received data bit. The distortion is caused when movement of the receiver or nearby objects results in a Doppler frequency shift of the received signal that is comparable to or greater than the bandwidth of the transmit signal.

A wideband signal transmitted in a multipath environment results in a frequency-selective fade. The overall intensity of the received signal has relatively little variation as the receiver moves in a multipath environment. However, the received signal has deep fades at certain frequencies. If the duration of the data bits is smaller than the multipath delay, the received signals experience intersymbol interference resulting from delayed replicas of earlier bits arriving at the receiver.

Frequency Division Multiple Access (FDMA) typically suffers from flat fading whereas multicarrier protocols, such as Orthogonal Frequency Division Multiplexing (OFDM), suffer from frequency-selective fading. CDMA typically suffers from both; however the direct sequence coding limits the effects of multipath to delays less than the chip rate of the code. Also, CDMA's capacity is limited by multi-user interference. Improved CDMA systems use interference cancellation to increase capacity; however, the required signal processing effort is proportional to at least the cube of the bandwidth. Furthermore, CDMA is susceptible to near-far interference, and its long pseudo-noise (PN) codes require long acquisition times. For these reasons, OFDM has been merged with CDMA.

OFDM has a high spectral efficiency (the spectrum of the subcarriers overlap) and combats frequency-selective fading. However, the amplitude of each carrier is affected by the Rayleigh law, hence flat fading occurs. Therefore, good channel estimation with an appropriate detection algorithm and channel coding is essential to compensate for fading. The performance of OFDM frequency diversity is comparable to the performance of an optimal CDMA system's multipath diversity (which requires a Rake receiver). Because diversity is inherent in OFDM, it is much simpler to achieve than in an optimal CDMA system. An OFDM system benefits from a lower-speed parallel type of signal processing. A Rake receiver in an optimal CDMA system uses a fast serial type of signal processing, which results in greater power consumption. In addition, the OFDM technique simplifies the channel estimation problem, thus simplifying the receiver design.

In multicarrier CDMA, a spreading sequence is converted from serial to parallel. Each chip in the sequence modulates a different carrier frequency. Thus, the resulting signal has a PN-coded structure in the frequency domain, and the processing gain is equal to the number of carriers. In multi-tone CDMA, the available spectrum is divided into a number of equiwidth frequency bands that are used to transmit a narrowband direct-sequence waveform.

Frequency-hopping spread spectrum can handle near-far interference well. The greatest benefit is that it can avoid portions of the spectrum. This allows the system to better avoid interference and frequency-selective fades. Disadvantages include the requirement for complex frequency synthesizers and error correction.

Time hopping has much higher bandwidth efficiency compared to direct sequence and frequency hopping. Its implementation is relatively simple. However, it has a long acquisition time and requires error correction.

U.S. Pat. Nos. 5,519,692 and 5,563,906 describe geometric harmonic modulation (GHM) in which preamble and traffic waveforms are created from multiple carrier frequencies (tones). The waveforms comprise tones incorporating a binary phase code where signal phases are 0 or $-\pi/2$. The binary phase offsets, which are applied to the tones, provide the spreading codes. Orthogonality of GHM signals is realized upon correlation with a reference signal at a receiver. A preamble carrier waveform is constructed by summing the tones. Therefore, the preamble signals are similar to MC-CDMA signals.

Each receiver monitors the preamble signals for its own phase code and then despreads and decodes the appended traffic waveforms. The traffic waveforms are products of the tones. The receiver generates a reference waveform from a product of tones having phase offsets that correspond to the receiver's phase code. The reference waveform is correlated with the received signals to produce a correlation result that is integrated over the data-bit duration and over all tones.

GHM uses binary phase offsets instead of differential phase offsets. Thus, GHM does not provide carriers with phase relationships that enable the superposition of the carriers to have narrow time-domain signatures. Consequently, received GHM signals require processing by a correlator, whereas signals that are orthogonal in time can be processed using simpler signal-processing techniques, such as time sampling and weight-and-sum. Furthermore, GHM does not achieve the capacity and signal-quality benefits enabled by time-orthogonal signals.

U.S. Pat. No. 4,628,517 shows a radio system that modulates an information signal onto multiple carrier frequencies. Received carriers are each converted to the same intermediate frequency using a bank of conversion oscillators. The received signals are then summed to achieve the benefits of frequency diversity. In this case, frequency diversity is achieved at the expense of reduced bandwidth efficiency. The process of converting the received signals to the same frequency does not allow orthogonality between multiple information signals modulated on the same carriers.

Each communications protocol presents different benefits and disadvantages. Benefits can be increased by merging different protocols, but only to a limited degree. There is a need for a flexible signaling protocol that can be adapted to different needs and criteria.

SUMMARY OF THE INVENTION

Some embodiments of the present invention may provide combined benefits of the previously mentioned protocols. One set of embodiments of the invention are specifically designed for mobile communications. Such embodiments may provide for interferometry of multiple carriers, such as Carrier Interference Multiple Access (CIMA). In CIMA, the frequency and phase of each carrier is selected so that a superposition of the carriers produces a pulse, such as a constructive interference signal resulting from a zero-phase (i.e., in-phase) relationship between the carriers occurs in a specific time interval. The resulting signal may have at least one main lobe (e.g., a pulse waveform), and a plurality of side lobes whose amplitudes are far below the amplitude of the at least one main lobe. Embodiments of the invention may be configured to employ pulse shapes and pulse positions that provide for time-domain orthogonality between different transmitted data symbols.

The carriers for a particular pulse waveform may span an entire data symbol interval, which typically includes at least one time interval where carrier superposition yields a negligible signal level. The phase relationship between the carriers is referred to as a phase space, which may be defined as a time (phase) offset between the carriers. A particular phase offset positions the pulse within a specific time interval. A receiver may be tuned to multiple phase spaces (in the frequency domain) and/or multiple time intervals (in the time domain) for processing a received signal. Thus, CIMA enables signals to be processed simultaneously as both low and high data-rate signals.

In a dispersive medium, such as an optical fiber, the phase space of a CIMA transmission may be selected to match the chromatic dispersion along a predefined length of the medium. The effect of the dispersion is that the phases of the carriers align, resulting in a pulse occurring in the medium at a predefined position.

The time-dependent nature of CIMA phase space also enables automatic scanning of an antenna array's beam pattern. If each element of an antenna array transmits a CIMA carrier, the array's beam pattern scans with a period that depends on the frequency spacing of the carriers and the separation between the antenna elements.

CIMA may be used to create any of the protocols previously mentioned. Embodiments of the present invention include methods and apparatus for transmitting and receiving CIMA signals. To this end, the following embodiments are described:

An embodiment of the invention may reduce the effects of multipath fading and interference. A consequence of such an embodiment may be a reduction of required transmission power.

Another embodiment may provide for secure communications by creating transmissions that are difficult to intercept. Low transmission power and the modulation of the carriers with CIMA coding may make transmissions difficult for an unintended receiver to detect.

Another embodiment of the invention may reduce interference to other radio systems and minimize the susceptibility of the communication system to all types of radio interference.

Another embodiment of the invention may be configured to reduce co-channel interference and compensate for co-channel interference that occurs when the communication system serves multiple users.

Another embodiment includes a spread-spectrum communication protocol that is not only compatible with adaptive antenna arrays, but may enable substantial performance benefits when combined with antenna-array technologies.

Another embodiment is a spread-spectrum communication system that may have performance benefits of a resource-limited system, the loading flexibility of an interference-limited system, and the ability to provide the benefits of both systems simultaneously. Further embodiments and benefits of the invention will become apparent in the Description of the Preferred Embodiments.

DESCRIPTION OF THE PREFERRED EMBODIMENTS

Figure 1:
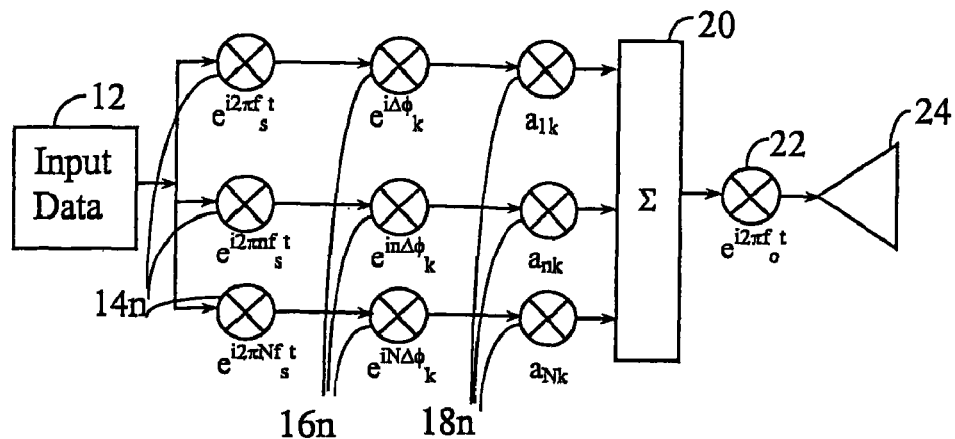
FIG. 1 is a schematic of a transmitter embodiment that generates CIMA signals.

FIG. 1 shows a flow diagram of a CIMA transmitter that converts a baseband information signal for a single user k to a CIMA signal for transmission. Data received from an input data source 12 modulates a number N of CIMA carriers, which have different carrier frequencies. This modulation occurs at a plurality of carrier mixers 14n (i.e., modulators). In this case, the frequencies of the CIMA signals are incrementally spaced by a shift frequency $f_s$. However, non-uniform spacing of the frequencies may also be used to achieve specific benefits described in U.S. patent application Ser. No. 09/022,950, which is hereby incorporated herein by reference. The carrier frequencies are typically chosen to be orthogonal to each other:

$$\int_0^{T_c} \cos(\omega_i t + \phi_i)\cos(\omega_j t + \phi_j)\,dt = 0$$

where $T_c$ is the symbol duration, $\omega_i$ and $\omega_j$ are the $i^{th}$ and $j^{th}$ carrier frequencies, and $\phi_i$ and $\phi_j$ are arbitrary phases. A signal in the $j^{th}$ frequency band does not cause interference in the $i^{th}$ frequency band. However, orthogonality of the waveforms is not required by embodiments of the invention.

The phase of each CIMA signal is set with respect to a predetermined receiver time interval and phase space in which the CIMA signals constructively combine when received by a CIMA receiver. An incremental phase offset of $e^{in\Delta\phi_k}$ is applied to each CIMA carrier by one of a plurality N of user-interval delay systems 16n. Each CIMA carrier has its gain adjusted by an amplitude-control system 18n. The amplitude control 18n provides a gain profile to the CIMA signals. This profile may include a tapered-amplitude window with respect to the frequency domain, compensation for flat fading of CIMA carriers in the communications channel, and pulse-amplitude modulation of the CIMA carriers (which limits the existence of the carriers to temporal regions near a predetermined receiver time interval for each carrier). The gain-adjusted CIMA signals are summed by a combining system 20. A frequency converter 22 may be used to convert the CIMA signals to the appropriate transmit frequencies, which are conveyed to an output coupler 24.

The output coupler 24 is any device that couples CIMA transmit signals into a communications channel from which CIMA signals are received by a receiver. For radio communications, the output coupler 24 may include one or more antenna elements (not shown). For optical communications, the output coupler 24 may be a lens or simple coupling element that couples light into an optical fiber. Although this diagram illustrates the generation of CIMA transmission signals as step-by-step procedures, a preferred embodiment for accomplishing these processes is to use digital signal-processing techniques, such as Discreet Fourier Transforms.

Figure 2:
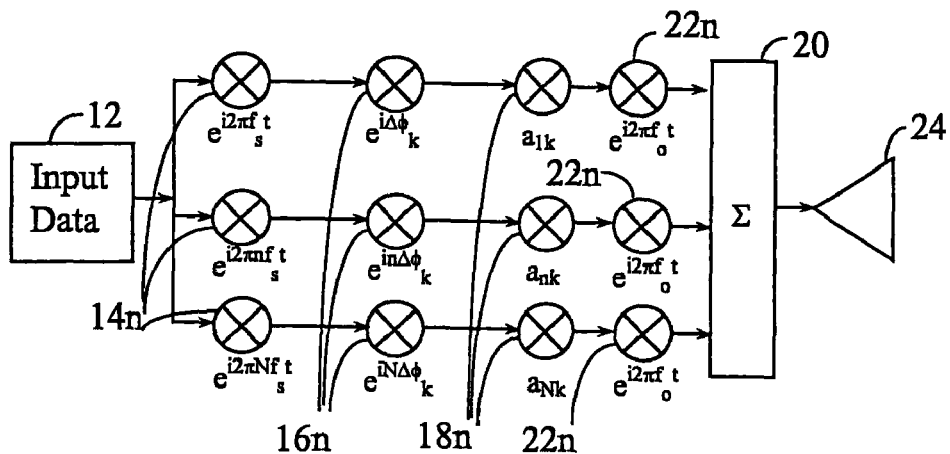
FIG. 2 is a second embodiment of a transmitter that generates CIMA signals.

The order of some of these processes may be switched. For example, modulation of each CIMA carrier by the input data may be the final step before combining. FIG. 2 shows a flow diagram for generating CIMA signals. Each of these processes is similar to the processes shown in FIG. 1.

Figure 3:
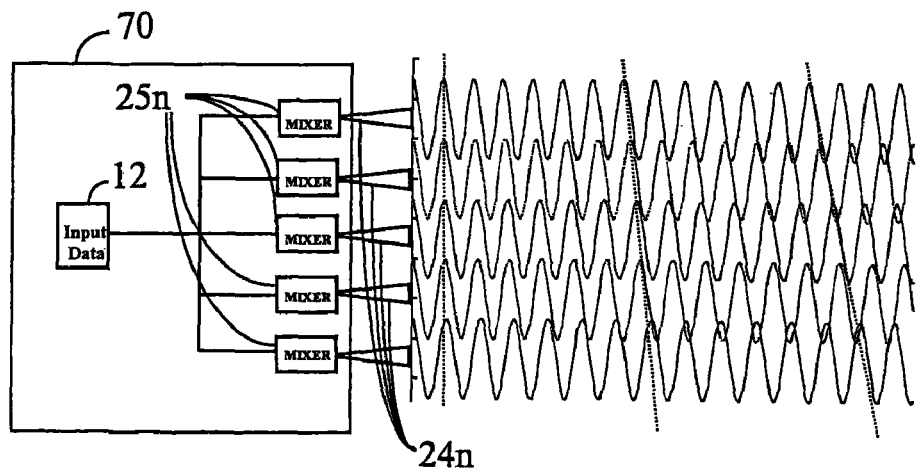
FIG. 3 is a schematic of a transmitter that generates CIMA carriers emitted by an antenna array.

FIG. 3 shows a data stream from the data source 12 being used to modulate a plurality of CIMA carriers at a plurality of mixers 25n. A CIMA carrier provided with a specific frequency, phase relationship and gain profile is input to each mixer 25n. Each bit from the data source 12 modulates all of the CIMA carriers. Each mixer 25n is connected to one of a plurality of antenna-array elements 24n; thus, each antenna element 24n transmits only one CIMA carrier. Although the collection of CIMA carriers has data redundancy due to the same bit being modulated onto multiple carriers, the frequency and phase relationships between the carriers may provide for orthogonality in time (illustrated by the Inverse Fourier Transform of the CIMA carriers in the frequency domain). This orthogonality negates the typical decrease in bandwidth efficiency caused by data redundancy and retains the benefits of frequency diversity. The orthogonality results from constructive and destructive interference between the CIMA carriers. Constructive interference causes narrow time-domain pulses with a repetition rate proportional to the inverse of the carrier-frequency spacing $f_s$.

Figure 4:
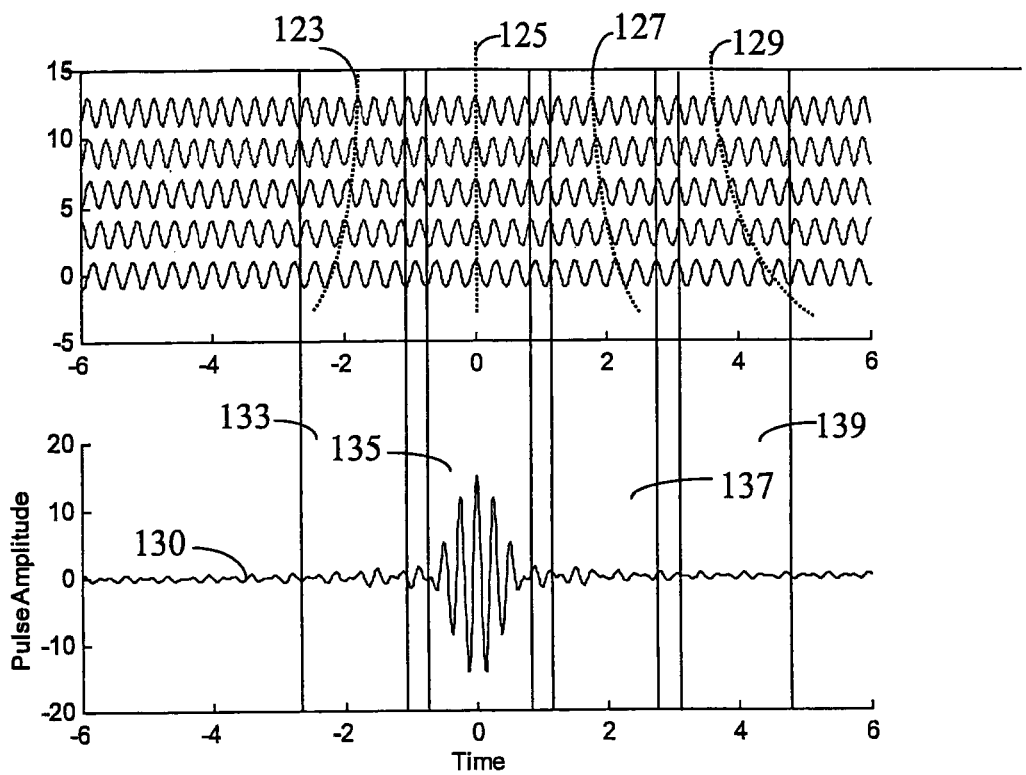
FIG. 4 is a plot of a plurality of CIMA carriers and a superposition of the carriers.

FIG. 4 illustrates how the phase fronts of CIMA carriers are aligned at a specific time. At other times, the carriers combine destructively. A composite signal 130 results from the summation of the carriers. The composite signal 130 shows a pulse envelope centered at time index 0 occurring in a predetermined time interval 135. In the case where there is no amplitude tapering (i.e., a rectangular window) and the CIMA carriers are uniformly spaced in frequency, a composite CIMA signal is:

$$e(t) = \sum_{n=1}^{N} e^{i[(\omega_c + n\omega_s)t + n\Delta\phi]}$$

which has a magnitude of:

$$|e(t)| = \left|\frac{\sin(N(\omega_s t + \Delta\phi)/2)}{\sin((\omega_s t + \Delta\phi)/2)}\right|$$

The CIMA signals are periodic with period $1/f_s$ for odd number of carriers N and with period $2/f_s$ for even number of carriers N. The main lobe has duration $2/Nf_s$ and the N−2 side lobes each have a duration $1/Nf_s$. The amplitude of the $l^{th}$ side lobe with respect to the main lobe amplitude is $$A(l) = \frac{1}{N\sin(\pi(l+1/2)/N)}$$

Because the period and width of the pulse envelope depends on the amplitudes, phases, and frequency separation of the CIMA carriers, the frequency of each carrier may be changed without affecting the pulse envelope as long as the relative carrier amplitudes, phases, and frequency separations are preserved. Thus, frequency hopping and frequency shifting of the carriers may be performed without substantially changing the temporal characteristics of the composite signal 130. Providing a tapered amplitude distribution to the CIMA carriers broadens the main lobe width and reduces the amplitude of the side lobes.

Figure 5A:
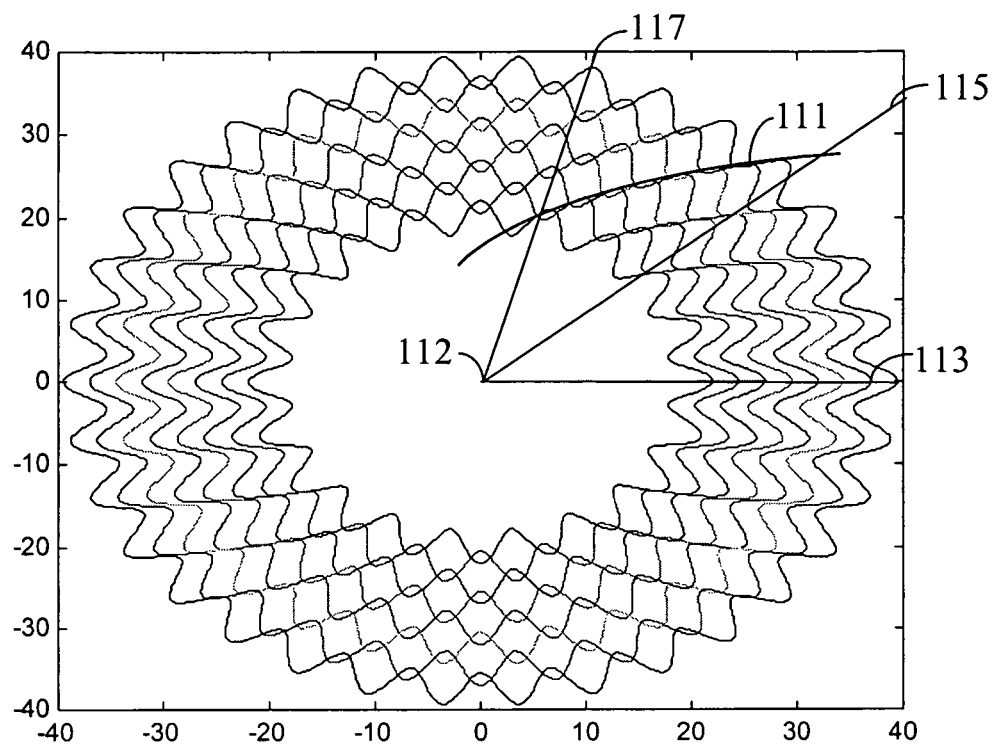
FIG. 5A is a plot of eight CIMA carriers that shows the relative phases between the carriers as a function of time and illustrates the phase spaces represented by the relative phases.
Figure 5B:
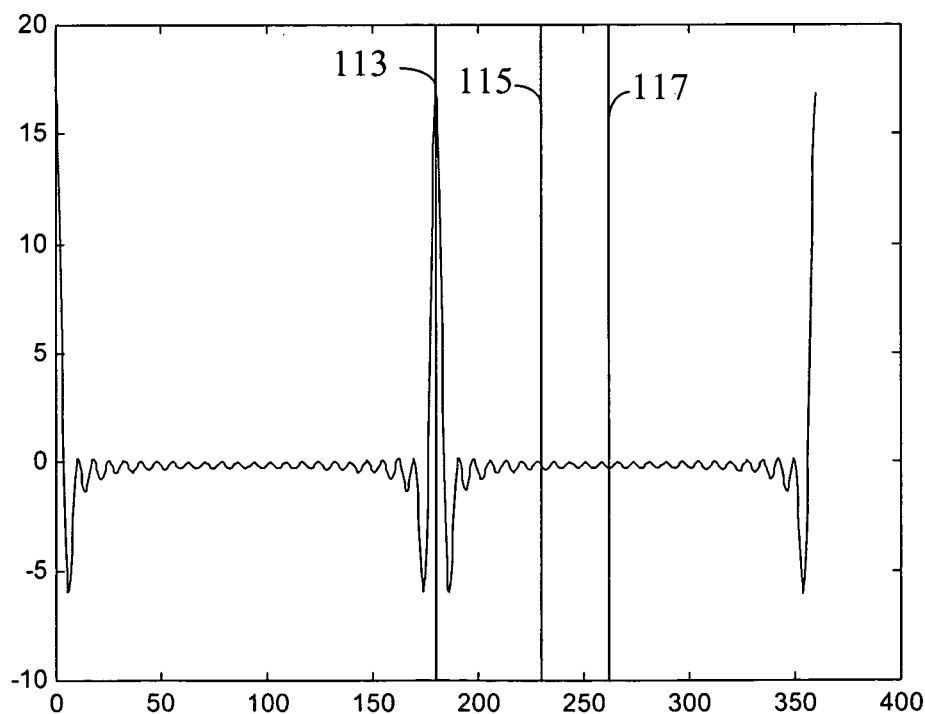
FIG. 5B is a time-domain plot of a superposition of the carrier signals shown in FIG. 5A.
Figure 6:
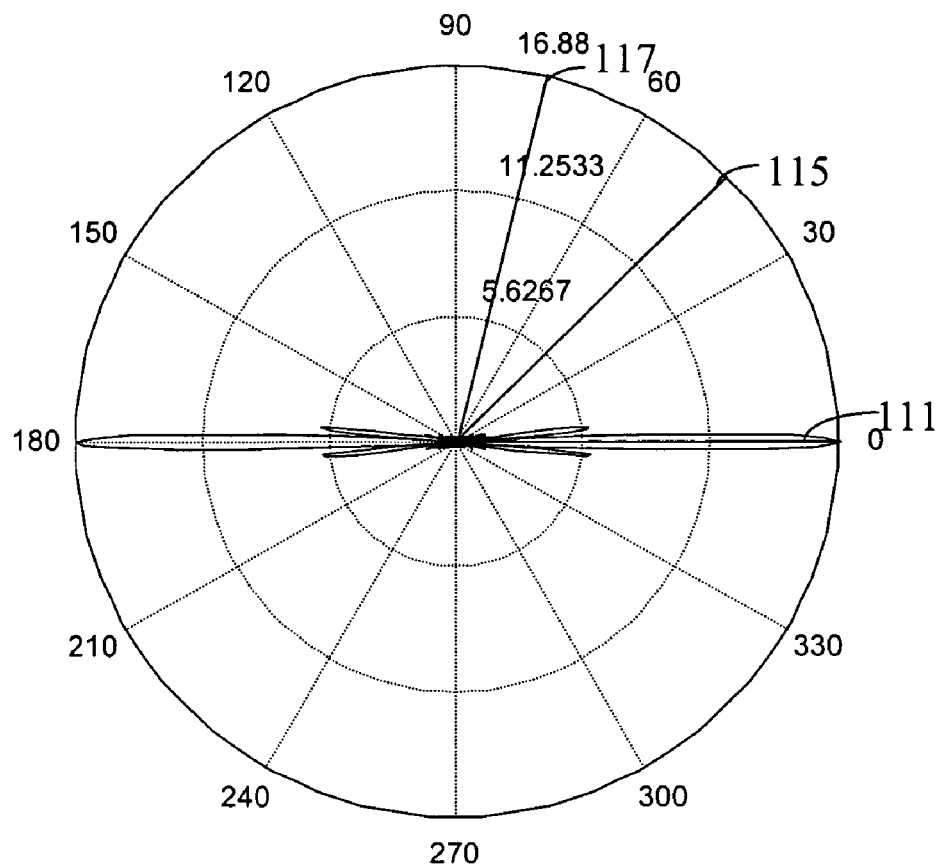
FIG. 6 is a polar plot in time of a superposition of the carriers shown in FIG. 5A.

FIG. 5A illustrates the phase space of the carriers shown in FIG. 4. As time moves forward, the phases between the CIMA carriers change. A straight line 113 indicates a zero-phase relationship between the carriers. A pulse is centered at a particular instant when there is a zero-phase relationship between all the carriers, yet the carriers exist in other time instants, even where no pulse is visible. When the carrier phases for a particular pulse return to in-phase (which it does as a periodic function of time), the pulse becomes visible. Zero-phase is the phase space in which all time-domain receivers operate. This phase space is illustrated by the sum of carrier amplitudes along any straight line that rotates about a fixed point 112. The sum of the amplitude of the waves along the line 113 as it rotates is shown in FIG. 5B and in a polar plot illustrated by FIG. 6.

In FIG. 5A, a curved line 111 illustrates one of the many out-of-phase phase spaces in which a pulse may be observed. This phase space 111 occurs within a time interval that is bounded by lines 115 and 117. In this time interval, the amplitude of the composite signal 130 (shown in FIG. 5B) is small. However, a receiver may tune to a specific phase space by selectively delaying (or equivalently, phase shifting) each of the received carriers by a predetermined amount before summing the carriers. In this way, a receiver may detect a data symbol in a phase space that is different than the phase space of the received carriers.

Figure 7:
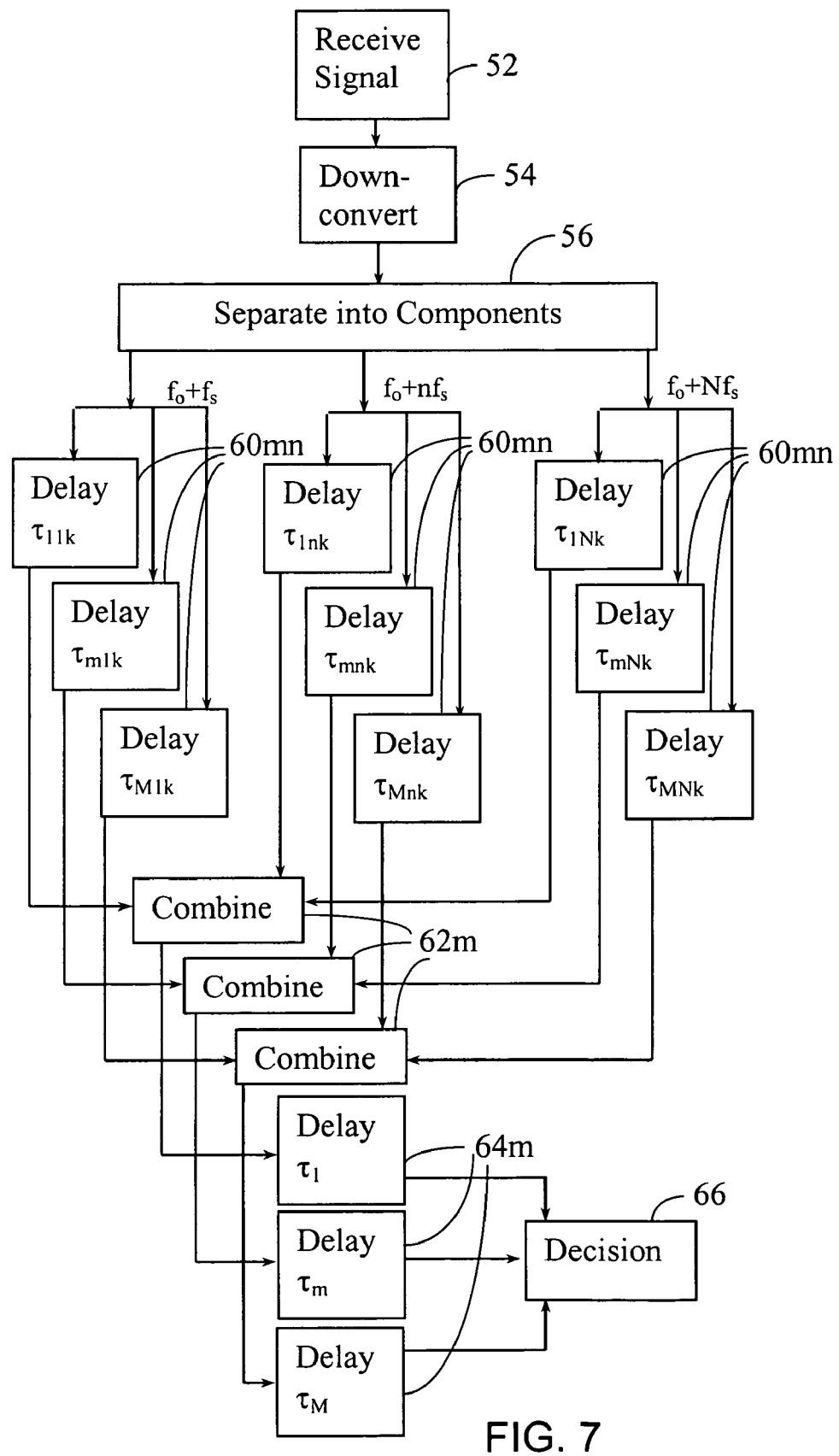
FIG. 7 is a flow diagram for a receiver embodiment configured to receive a CIMA signal and sample the signal in multiple phase spaces.
Figure 9A:
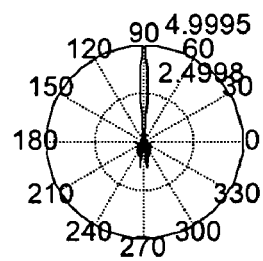
FIG. 9A through 9L shows a periodic beam pattern produced by the transmitter embodiment in FIG. 3 at different times.
Figure 9B:
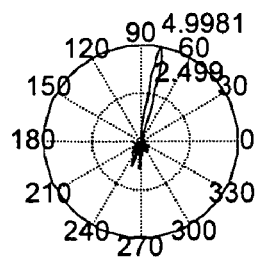
Figure 9C:
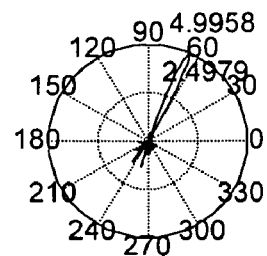
Figure 9D:
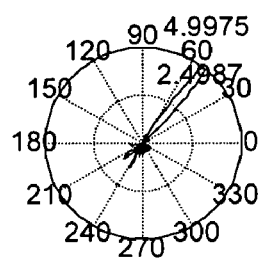
Figure 9E:
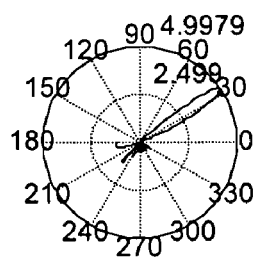
Figure 9F:
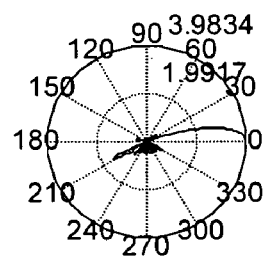
Figure 9G:
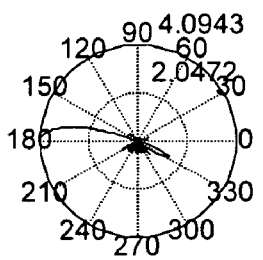
Figure 9H:
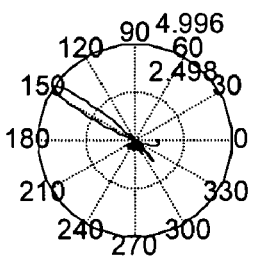
Figure 9I:
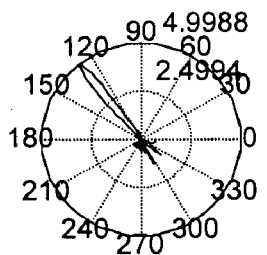
Figure 9J:
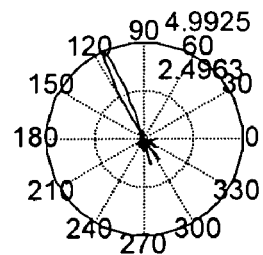
Figure 9K:
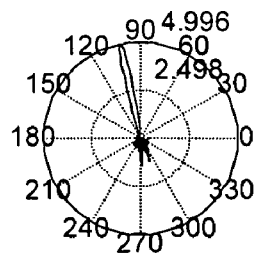
Figure 9L:
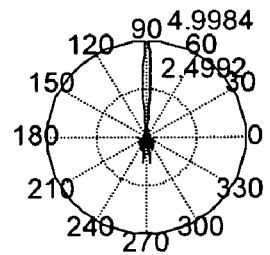

FIG. 7 shows a single-user phase-space receiver that is capable of sampling in multiple phase spaces. A received CIMA signal is detected from the communications channel by a receiving element 52 and down-converted by a mixer 54 before being separated into its N component carriers by a frequency filter 56. Depending upon how the transmit signal may have been altered by the communications channel, one of a plurality of gain compensators (not shown) may apply a gain compensation to each component n. Then each gain-compensated component is split into a number M of delay components, each of which is delayed by a phase-space delay compensator 60$mn$. The output of each m-numbered delay component is summed at a combining step 62 to reconstruct pulses observed in other phase spaces. Each pulse may be delayed at a delay step 64$m$ to synchronize the pulses before being summed in a decision step 66 that outputs an estimate of the original transmit signal. In practice, the delay step 64$m$ may be integrated into the decision step 66.

This receiver obtains multiple samples of the pulse because it tracks the pulse through different phase spaces. Thus, the receiver benefits from the relatively slow data rate (i.e., pulse period) of the data on the CIMA carriers. This alleviates much of the problem of inter-symbol interference. The short duration (i.e., high bandwidth) of each pulse allows the receiver to mitigate the flat fading associated with narrowband signals. Although the pulse is comprised of many narrowband CIMA carriers, flat fading (which causes very deep fades) is avoided because data on each CIMA pulse is spread across a large number of CIMA carriers. Furthermore, if the number of and spacing between the CIMA carriers are appropriately chosen, it is unlikely that more than one CIMA carrier will be located in a deep fade. Thus, frequency diversity is achieved.

Each user k may share the communication resource through a unique selection of the phase offset (i.e., timing offset) while employing the same carriers as other users. If N orthogonal carriers are shared by each user k, then N users may use the resource without co-channel interference. In this case, there is a unique combination of phase space with respect to time for each user k. Similarly, users employing different CIMA carriers may use the same phase space with respect to time without co-channel interference. Because the pulse characteristics depend on the frequency and phase relationships between the CIMA carriers, the frequency and phase of each CIMA signal may be changed without altering the characteristics of the pulse envelope as long as those relationships between the CIMA carriers remain unchanged. This enables a transmitter to frequency hop to avoid interference or enhance security.

Figure 8:
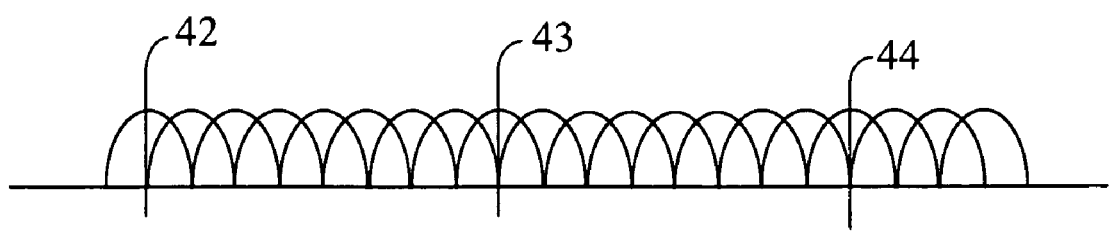
FIG. 8 shows part of a frequency profile for a group of CIMA carriers.

Separation $f_s$ between the CIMA carriers for each user may be selected as shown in FIG. 8 such that it exceeds the coherence bandwidth (i.e., the inverse of the multipath duration). This results in frequency nonselective fading over each carrier. If adjacent CIMA carriers overlap in frequency by 50%, the system capacity increases by two-fold above the classical limitation imposed by non-overlapping carriers. Such a system does not have independent channel-fading characteristics over each carrier. However, CIMA carriers do not need to be adjacent in frequency. The system can attain N-fold frequency-diversity gain by using a subset of carrier frequencies for each set of users such that the carrier separations for each user k exceeds the coherence bandwidth. For example, in the frequency profile shown in FIG. 8, a set of nonadjacent carrier frequencies 42, 43, and 44 may be selected for a particular group of users. This frequency profile allows both time offsets and frequency division multiplexing to optimize bandwidth efficiency. If the bandwidth of each carrier is small compared to the carrier separations, unauthorized interception of the CIMA signal by a broadband receiver is more difficult. The amount of background noise received by a receiver depends on the bandwidth of the receiver. A CIMA receiver may be tuned to receive CIMA carriers at predetermined narrow bands in which the signal-to-noise ratio (SNR) is relatively large. However, a broadband receiver receives noise components in the spectrum between the CIMA carriers, resulting in a low SNR.

If the number of users k exceeds the number of CIMA carriers N, the timing offset of each user k can be selected to position the CIMA pulses to minimize the mean square cross correlations between the pulses. User signals may also be positioned relative to the type and priority of each user's communication channel. This ensures quality of service for specific users or types of transmissions. This also provides the quality of a resource-limited system when the number of users is at or below the classical limit of a resource-limited system and provides interference-limited operations when demand exceeds the classical limit.

Although the receiver shown in FIG. 7 is described as a single-user receiver, a alternative mode of operation may provide for multi-user detection. Unlike direct-sequence CDMA where each user contributes noise to every other user's communication channel, CIMA may limit multi-user interference to signals (pulses) that are nearby in the time domain. In the preferred mode of operation, the receiver samples adjacent signals in as few as two neighboring time intervals. Then it performs a weight and sum in the decision step 66 to cancel those contributions to the signal of interest.

The separation d between the antenna elements 24$n$ of the transmitter 70 (shown in FIG. 3) results in an azimuthal variation of the beam pattern produced by the array 24$n$ due to the time-dependent phase-space characteristic of the CIMA signal. In other words, as the phase space of the CIMA signals changes with time, the beam pattern of the array 24$n$ scans. The time dependence of the beam pattern's directionality is shown by the following beam-pattern equation:

$$D(t) = \sum_{n=1}^{N} a_n \cos((\omega_o + n\omega_s)t + 2\pi n d \sin\vartheta / \lambda_n)$$

where $\alpha_n$ is the amplitude of each CIMA carrier, $\omega_o + \omega_s$ is the radial frequency of the $n^{th}$ CIMA carrier, $\lambda_n$ is the CIMA carrier wavelength, $\theta$ is the azimuthal angle, and d is the separation between the array elements 24$n$. This characteristic of the CIMA beam pattern may further enhance the diversity benefits of CIMA. Prior art shows that changing the beam pattern of a transmitting antenna aids in diversity reception.

Plots of the beam pattern equation D(t) are shown in FIGS. 9A through 9L for $d=\lambda_o/2$ and incremental values of time t. Different values for separation d result in changes to the number of main lobes and the rate at which they scan. Adjusting the frequency separations changes the directionality D(t).

Figure 10:
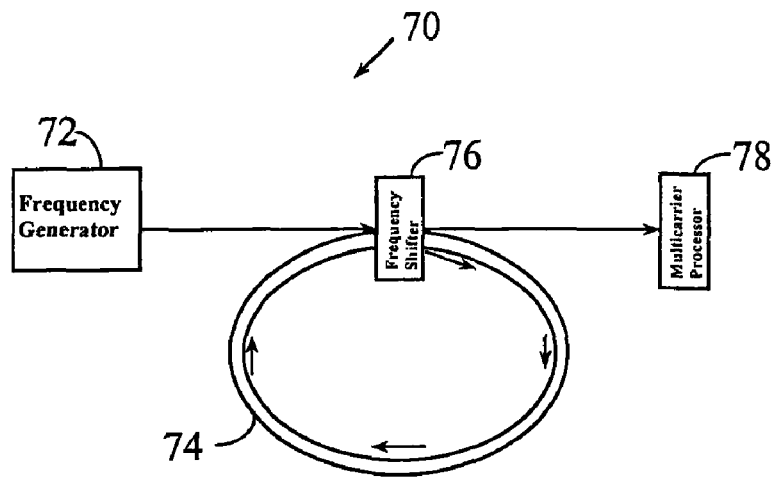
FIG. 10 is a frequency-shifted feedback cavity embodiment that includes a traveling-wave cavity and a frequency-shifting device through which optical signals are circulated.

FIG. 10 shows a frequency-shifted feedback cavity (FSFC) 70 that can be used to generate CIMA signals. A base-frequency generator 72 produces an optical base frequency $f_o$ signal from which frequency-shifted signals are created. The base-frequency signal is input to a traveling-wave cavity 74 that includes a frequency shifter 76. The frequency shifter 76 may be an acousto-optic modulator (AOM). As light circulates through the cavity 74, it is shifted in frequency by an amount $f_s$ each time it passes through the frequency shifter 76. The traveling-wave cavity 74 does not selectively attenuate frequencies. Rather, the oscillations it supports are characterized by an unusually broad spectral output that has no mode structure. A portion of the light is output from the cavity to a multicarrier processor 78. For example, an AOM (not shown) diffracts light passing through it; the light is then fed back into the cavity 74. An undiffracted portion of the beam provides a convenient output. The output of the processor 78 is conveyed to an output coupler (not shown), for example, an antenna, a focusing element, or a connector to an optical fiber.

The output beam consists of multiple beams of incrementally delayed, frequency-shifted light. The amount of delay incurred by each output beam component is identified by the frequency of the component. If the cavity 74 does not cause the light to undergo a significant amount of chromatic dispersion, the amount of delay incurred by an output component is substantially proportional to the amount of frequency shift the beam has incurred. The multicarrier processor 78 may include diffractive optics to wavelength demultiplex the output components. If the base-frequency generator 72 modulates the optical base signal with an information signal, the output of the multicarrier processor 78 includes multiple delayed (and separated) versions of the modulated signal. Each of the delayed versions of the modulated signal may be used to modulate a transmit signal emitted by each of the antenna array elements 24n shown in FIG. 3. If each array element 24n emits a transmit signal having the same distribution of frequencies, the directionality of the beam pattern produced by the array 24n does not change in time. Rather, the directionality can be adjusted simply by changing the length of the traveling-wave cavity 74.

The FSFC 70 may also be used as a receiver for sampling received CIMA signals in nonzero-phase spaces. This requires that the frequency shift $f_s$ by the frequency shifter 76 match the frequency separation of the received CIMA signals. Light output from the FSFC 70 is separated by wavelength to identify the different phase-space samples of the received CIMA signal. These phase spaces will be substantially linear if the cavity 74 does not cause chromatic dispersion. Linear phase space sampling matches the phase spaces of the received signals provided that $f^*_o >> N \cdot f_s$.

The FSFC 70 shown in FIG. 10 may be used to generated CIMA signals for transmission through an optical fiber or waveguide. In this mode of operation, the frequency generator 72 produces an unmodulated optical base signal. The output of the travelling-wave cavity 74 is a collinear superposition of CIMA carriers and is easy to couple into an optical fiber. Thus, the multicarrier processor 78 does not separate the components. The multicarrier processor 78 modulates the CIMA signals with an information signal that has a predefined duration in the time domain. The timing and duration of the information signal can be chosen to compensate for chromatic dispersion of the CIMA carriers as they propagate through the fiber.

Chromatic dispersion occurs in an optical fiber as different wavelengths of light travel at different speeds. Optical fiber has different indices of refraction for different wavelengths of light. The speed of light in the material is inversely proportional to the index of refraction. In material dispersion, light with a long wavelength travels faster than light with a shorter wavelength. This causes distortion (broadening) of optical pulses transmitted through an optical fiber.

FIG. 4 shows the phase relationship between CIMA carriers as a CIMA signal propagates in a nondispersive medium. As the CIMA carriers propagate through space, CIMA pulses do not distort because the phase relationships between the carriers do not change except for their periodic relationship. For example, a receiver moving at the speed of the carriers detects no changes in the relative phase of the carriers. Another way of describing this is that two stationary receivers may be spaced apart by an integer number of pulse periods, and they detect the same phase relationships between the CIMA carriers. However, in a dispersive medium, the two stationary detectors detect different phase relationships because some of the carriers have traveled further in phase. The following equation shows the difference in wavelength between adjacent CIMA carriers:

$$\Delta\lambda = \frac{cf_s}{f_o(f_o + f_s)}$$

This is a nonlinear relationship in which the wavelength difference $\Delta\lambda$ between adjacent CIMA carriers increases as the wavelength of each carrier increases. This is illustrated by a phase profile 123 of carrier maxima in FIG. 4. The frequency separation $f_s$ is selected with respect to the dispersion characteristics of an optical fiber 150 to match the velocity profile of the carriers with their phase profile. Then portions of the carriers are selected to constructively combine to create CIMA pulses at predetermined locations along the fiber 150.

The CIMA carriers may be pulse-amplitude modulated in a time interval 133 in which the phase profile 123 occurs. In that time interval 133, the composite signal 130 resulting from the sum of the carriers is small. As the carriers propagate through the fiber 150, the relative phases of the carriers change. During a later time interval 135, the carrier signal phases line up at a specific time 125, which results in constructive interference that causes a pulse to occur in the composite signal 130. At later time intervals 127 and 129, the low-wavelength carriers have traveled slightly farther, resulting in distorted phase profiles 137 and 139, respectively. The composite signal 130 in these time intervals returns to substantially zero.

Figure 11:
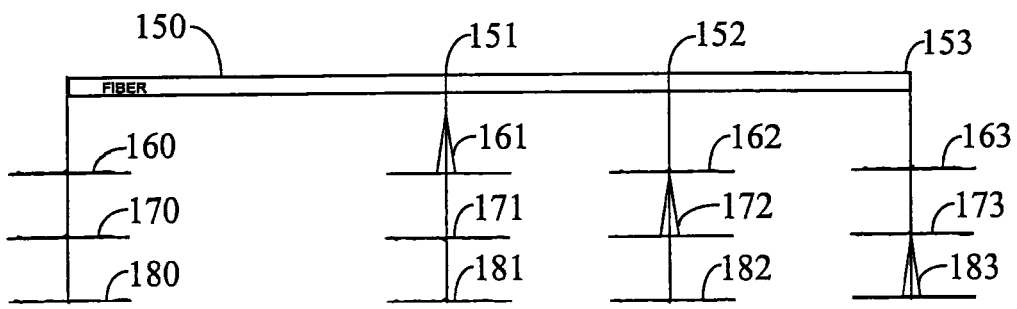
FIG. 11 shows different CIMA signals as they propagate down an optical fiber where the phase offsets of the carriers are matched to the chromatic dispersion properties of the fiber.

FIG. 11 shows a plurality of composite CIMA signals along a dispersive optical fiber 150. Three signals 160, 170, and 180 are input at one end of the fiber 150. The phase profile of the first signal 160 is selected such that the CIMA carriers combine constructively to produce a pulse 161 at a first node 151. The first CIMA carriers 160 combine destructively to produce low-level signals 162 and 163, at second and third nodes 152 and 153, respectively. Similarly, the carrier phases of the second signal 170 are selected to produce a constructively interfering signal 172 at the second node 152. Likewise, the carrier phases of the third signal 180 are selected to provide constructive interference 183 at the third node 153. By making use of the nonlinear dispersion of light in an optical fiber, it may be possible to expand the usable bandwidth of the optical fiber beyond classical limitations.

Figure 12A:
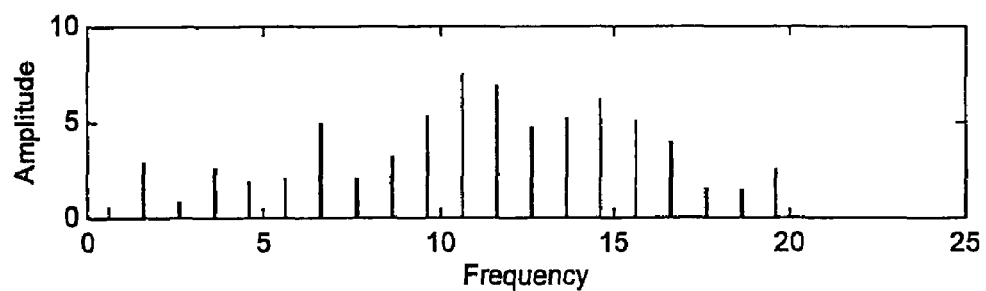
FIG. 12A is a plot of the relative frequency-versus-amplitude profile of CIMA carriers configured to generate a direct sequence CDMA chip sequence in the time domain.
Figure 12B:
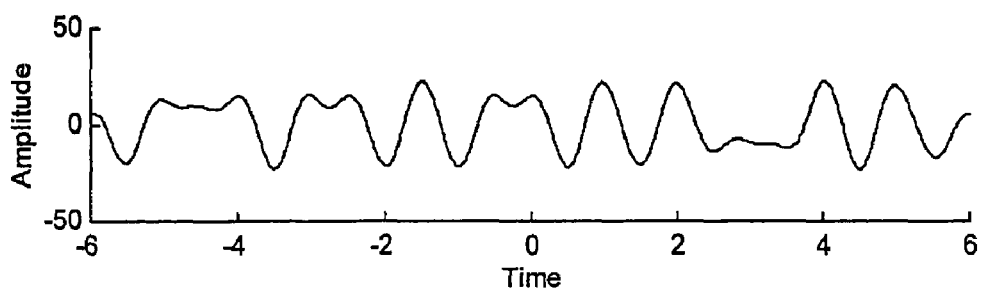
FIG. 12B is a time-domain representation of a direct sequence CDMA signal generated by the CIMA carriers shown in FIG. 12A.

FIG. 12A shows an amplitude distribution for twenty CIMA carriers. These carriers produce a combined signal shown in FIG. 12B consisting of a pseudo-random sequence of positive and negative CIMA pulses. Thus, a particular distribution of carrier amplitudes in the frequency domain results in a direct-sequence CDMA code that is periodic in the time domain. When CIMA signals are used as the basis for a CDMA system, the CDMA system may have reduced multipath and inter-symbol interference, increased capacity, and reduced co-channel interference. CIMA signals that are sinc functions have a high autocorrelation efficiency. The autocorrelation function falls off rapidly when synchronization is lost.

The preferred embodiments demonstrate a few of the many methods for generating and receiving CIMA signals. This was done to provide a basic understanding of the characteristics of CIMA. With respect to this understanding, many aspects of this invention may vary; for example, the methods used to create and process CIMA signals. It should be understood that such variations fall within the scope of the present invention, its essence lying more fundamentally with the design realizations and discoveries achieved than the particular designs developed.

The foregoing discussion and the claims that follow describe the preferred embodiments of the present invention. Particularly with respect to the claims, it should be understood that changes might be made without departing from the essence of the invention. In this regard, it is intended that such changes still fall within the scope of the present invention. To the extent such revisions utilize the essence of the present invention, each naturally falls within the breadth of protection encompassed by this patent. This is particularly true for the present invention because its basic concepts and understandings are fundamental in nature and can be broadly applied.

The invention claimed is:

1. A method for enhancing transmit diversity in a wireless data-communication system comprising:
modulating each of at least one data symbol onto a plurality of carrier signals to be transmitted from a plurality of antennas, thereby producing a transmitted signal, and periodically changing, at a constant time interval, at least one signal transmission characteristic of the transmitted signal by introducing a signal-parameter variation to at least one of the carrier signals, wherein said periodically changing is performed independently of said modulating, wherein said periodically changing comprises periodically changing a relative signal phase between at least two of the plurality of carrier signals.

2. A method for enhancing transmit diversity in a wireless data-communication system comprising:
modulating each of at least one data symbol onto a plurality of carrier signals to be transmitted from a plurality of antennas, thereby producing a transmitted signal, and periodically changing, at a constant time interval, at least one signal transmission characteristic of the transmitted signal by introducing a signal-parameter variation to at least one of the carrier signals, wherein said periodically changing is performed independently of said modulating, wherein said periodically changing comprises providing a predetermined amplitude profile to the plurality of carrier signals.

3. A method for enhancing transmit diversity in a wireless data-communication system comprising:
modulating each of at least one data symbol onto a plurality of carrier signals to be transmitted from a plurality of antennas, thereby producing a transmitted signal, and periodically changing, at a constant time interval, at least one signal transmission characteristic of the transmitted signal by introducing a signal-parameter variation to at least one of the carrier signals, wherein said periodically changing is performed independently of said modulating, wherein said periodically changing comprises providing a frequency offset between at least two of the plurality of carrier signals.

4. A method for enhancing transmit diversity in a wireless data-communication system comprising:
modulating each of at least one data symbol onto a plurality of carrier signals to be transmitted from a plurality of antennas, thereby producing a transmitted signal, and periodically changing, at a constant time interval, at least one signal transmission characteristic of the transmitted signal by introducing a signal-parameter variation to at least one of the carrier signals, wherein said periodically changing is performed independently of said modulating, wherein said periodically changing further comprises producing a periodically scanning beam pattern produced by the plurality of antennas.

5. The method recited in claim 1, wherein the plurality of carrier signals includes at least one type of signal selected from a set of signal types, the set comprising OFDM signals and frequency-hopped signals.

6. The method recited in claim 4, wherein the constant time interval depends on at least one quantity selected from the group consisting of a carrier frequency spacing and a separation between antenna elements.

7. A method for enhancing transmit diversity in a wireless data-communication system comprising:
modulating each of at least one data symbol onto a plurality of carrier signals to be transmitted from a plurality of antennas, thereby producing a transmitted signal, and periodically changing, at a constant time interval, at least one signal transmission characteristic of the transmitted signal by introducing a signal-parameter variation to at least one of the carrier signals, wherein said periodically changing is performed independently of said modulating, wherein said modulating or said periodically changing comprises multiplying the data symbol with a set of coefficients having linear phase shifts.

8. A transmitter for a wireless data-communication system configured to modulate each of at least one data symbol onto a plurality of carriers, comprising:
a data symbol input; and
a multicarrier generator to be coupled to a plurality of antennas and configured to provide each of the plurality of carriers with at least one signal parameter selected from the group consisting of a frequency, phase relationship, and gain, wherein the at least one signal parameter is selected to periodically change, at a constant time interval, at least one transmit beam pattern to be produced by the plurality of antennas, wherein the multicarrier generator is configured to periodically change a relative signal phase between at least two of the plurality of carriers.

9. A transmitter for a wireless data-communication system configured to modulate each of at least one data symbol onto a plurality of carriers, comprising:
a data symbol input; and
a multicarrier generator to be coupled to a plurality of antennas and configured to provide each of the plurality of carriers with at least one signal parameter selected from the group consisting of a frequency, phase relationship, and gain, wherein the at least one signal parameter is selected to periodically change, at a constant time interval, at least one transmit beam pattern to be produced by the plurality of antennas, wherein the multicarrier generator is configured to periodically scan the at least one transmit beam pattern.

10. The transmitter recited in claim 9, wherein the plurality of carriers includes at least one type of signal selected from a set of signal types, the set comprising OFDM signals and frequency-hopped signals.

11. The transmitter recited in claim 9, wherein the multicarrier generator is configured to provide a predetermined amplitude profile to the plurality of carriers.

12. The transmitter recited in claim 9, wherein the multicarrier generator is configured to provide a frequency offset between at least two of the plurality of carriers.

13. The transmitter recited in claim 9, wherein at least one of the multicarrier generator or a modulator is configured to multiply the at least one data symbol with a set of coefficients having linear phase shifts.

14. The transmitter recited in claim 9, wherein the constant time interval depends on at least one of a carrier frequency spacing or a separation between antenna elements.

15. A communications device configured to transmit a plurality of N carrier signals in parallel, each of the N carrier signals corresponding to a different one of N signal frequencies, the communications device including:
   a plurality of N separate carrier signal paths operating in parallel, the N separate carrier signal paths to be coupled to a multicarrier signal generator configured to generate the plurality of N carrier signals, wherein the multicarrier signal generator is further configured to adjust at least one parameter of at least one of the plurality of N carrier signals to periodically change, at a constant time interval, an overall signaling parameter when the N carrier signals are substantially simultaneously transmitted,
   a modulator configured to modulate each of at least one data symbol onto the plurality of N carrier signals, and
   a transmitter array comprising N transmitter elements, each of the N transmitter elements to be coupled to a different one of the plurality of the N separate carrier signal paths, wherein the multicarrier signal generator is configured periodically scan at least one transmit beam pattern generated by the transmitter array.

16. A communications device configured to transmit a plurality of N carrier signals in parallel, each of the N carrier signals corresponding to a different one of N signal frequencies, the communications device including:
   a plurality of N separate carrier signal paths operating in parallel, the N separate carrier signal paths to be coupled to a multicarrier signal generator configured to generate the plurality of N carrier signals, wherein the multicarrier signal generator is further configured to adjust at least one parameter of at least one of the plurality of N carrier signals to periodically change, at a constant time interval, an overall signaling parameter when the N carrier signals are substantially simultaneously transmitted,
   a modulator configured to modulate each of at least one data symbol onto the plurality of N carrier signals, and
   a transmitter array comprising N transmitter elements, each of the N transmitter elements to be coupled to a different one of the plurality of the N separate carrier signal paths,
   wherein at least one element selected from the group consisting of the multicarrier signal generator and the modulator is configured to multiply the at least one data symbol with a set of coefficients having linear phase shifts.

17. A communications device configured to transmit a plurality of N carrier signals in parallel, each of the N carrier signals corresponding to a different one of N signal frequencies, the communications device including:
   a plurality of N separate carrier signal paths operating in parallel, the N separate carrier signal paths to be coupled to a multicarrier signal generator configured to generate the plurality of N carrier signals, wherein the multicarrier signal generator is further configured to adjust at least one parameter of at least one of the plurality of N carrier signals to periodically change, at a constant time interval, an overall signaling parameter when the N carrier signals are substantially simultaneously transmitted,
   a modulator configured to modulate each of at least one data symbol onto the plurality of N carrier signals, wherein the modulator is configured to independently modulate each of the plurality of N carrier signals, and
   a transmitter array comprising N transmitter elements, each of the N transmitter elements to be coupled to a different one of the plurality of the N separate carrier signal paths.

18. A communications device configured to transmit a plurality of N carrier signals in parallel, each of the N carrier signals corresponding to a different one of N signal frequencies, the communications device including:
   a plurality of N separate carrier signal paths operating in parallel, the N separate carrier signal paths to be coupled to a multicarrier signal generator configured to generate the plurality of N carrier signals, wherein the multicarrier signal generator is further configured to adjust at least one parameter of at least one of the plurality of N carrier signals to periodically change, at a constant time interval, an overall signaling parameter when the N carrier signals are substantially simultaneously transmitted,
   a modulator configured to modulate each of at least one data symbol onto the plurality of N carrier signals, and
   a transmitter array comprising N transmitter elements, each of the N transmitter elements to be coupled to a different one of the plurality of the N separate carrier signal paths, wherein the periodic change in an overall signaling parameter corresponds to a periodic change in a transmit beam pattern.

19. The communications device recited in claim 18, wherein the plurality of N carrier signals includes at least one type of signal selected from a set of signal types, the set comprising OFDM signals and frequency-hopped signals.

20. A communications device configured to transmit a plurality of N carrier signals in parallel, each of the N carrier signals corresponding to a different one of N signal frequencies, the communications device including:
   a plurality of N separate carrier signal paths operating in parallel, the N separate carrier signal paths to be coupled to a multicarrier signal generator configured to generate the plurality of N carrier signals, wherein the multicarrier signal generator is further configured to adjust at least one parameter of at least one of the plurality of N carrier signals to periodically change, at a constant time interval, an overall signaling parameter when the N carrier signals are substantially simultaneously transmitted,
   a modulator configured to modulate each of at least one data symbol onto the plurality of N carrier signals, and
   a transmitter array comprising N transmitter elements, each of the N transmitter elements to be coupled to a different one of the plurality of the N separate carrier signal paths, wherein the constant time interval depends on at least one quantity selected from the group consisting of a carrier frequency spacing and a separation between antenna elements of the transmitter elements.

* * * * *